(12) United States Patent
Somin et al.

(10) Patent No.: US 9,448,685 B1
(45) Date of Patent: Sep. 20, 2016

(54) PREEMPTIVE EVENT NOTIFICATION FOR MEDIA EXPERIENCE

(71) Applicant: Amazon Technologies, Inc., Reno, NV (US)

(72) Inventors: Irina Mikhaylovna Somin, Mountain View, CA (US); Michael Hurnaus, Schlaegl (AT); Ketaki Rao, Sunnyvale, CA (US); Santhosh Kumar P. Krishnankutty, Dublin, CA (US)

(73) Assignee: Amazon Technologies, Inc., Reno, NV (US)

( * ) Notice: Subject to any disclaimer, the term of this patent is extended or adjusted under 35 U.S.C. 154(b) by 198 days.

(21) Appl. No.: 13/682,017

(22) Filed: Nov. 20, 2012

(51) Int. Cl.
*G06F 3/0481* (2013.01)

(52) U.S. Cl.
CPC .................................. *G06F 3/0481* (2013.01)

(58) Field of Classification Search
CPC ............. H04L 67/025; H04L 12/1813; H04L 51/046; H04L 65/60; H04M 1/72552; H04N 5/44543; H04N 21/4622; H04N 21/47; G11B 27/34; G11B 27/034
See application file for complete search history.

(56) References Cited

U.S. PATENT DOCUMENTS

| | | | |
|---|---|---|---|
| 5,537,337 A * | 7/1996 | Williams ....................... 702/178 |
| 8,572,649 B1 * | 10/2013 | Gossweiler, III .. H04N 21/4532 725/39 |
| 9,129,264 B2 * | 9/2015 | Lyle ............... G06Q 10/063116 |
| 2005/0273815 A1 * | 12/2005 | Orr et al. ........................ 725/45 |
| 2006/0019638 A1 * | 1/2006 | Chiu .................... G06Q 10/109 455/412.2 |
| 2006/0285533 A1 * | 12/2006 | Divine et al. .................. 370/352 |
| 2008/0167938 A1 * | 7/2008 | Meisels et al. ................... 705/9 |
| 2010/0094678 A1 * | 4/2010 | Gupta et al. ...................... 705/9 |
| 2011/0244955 A1 * | 10/2011 | Dinka ................ H04N 5/44591 463/31 |
| 2011/0298614 A1 * | 12/2011 | Bells ......................... 340/539.13 |
| 2012/0290956 A1 * | 11/2012 | Lance et al. .................. 715/764 |
| 2012/0311045 A1 * | 12/2012 | Sylvain ................... H04L 51/12 709/206 |
| 2013/0104170 A1 * | 4/2013 | Su ...................... H04N 21/4332 725/40 |
| 2014/0288686 A1 * | 9/2014 | Sant ........................ G06F 3/165 700/94 |

FOREIGN PATENT DOCUMENTS

EP          2455896 A1 *   5/2012   ............. G06Q 10/00

* cited by examiner

*Primary Examiner* — Jeffrey A Gaffin
*Assistant Examiner* — Mandrita Brahmachari
(74) *Attorney, Agent, or Firm* — Lowenstein Sandler LLP

(57) ABSTRACT

A notification manager receives a request for an application to execute an action. The notification manager determines whether an event is scheduled to occur during a time that the application is executing the action. If so, the notification manager presents a notification of the event prior to the application executing the action, so as not to interrupt the execution of the action when it comes time for the event to occur.

20 Claims, 10 Drawing Sheets

PREEMPTIVE EVENT NOTIFICATION FOR MEDIA EXPERIENCE

BACKGROUND

A large and growing population of users enjoys entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like.

One feature common to many electronic devices is the ability to provide notifications to a user for scheduled or unscheduled events. For example, if a calendar application running on the electronic device has an event scheduled for a certain time, the device may provide a notification, such as a visual indication or an audio indication, of the event at the start time of the event or prior to the start time of the event (e.g., a reminder). In certain cases where the user is using the electronic device for playback of a media item (e.g., playing a movie, reading an electronic book), the notification may interrupt the user experience. For example, it may be undesirable to receive notifications while the user is using the electronic device to perform certain actions. Conventionally, the user has no way to manage when or how notifications are received, when the electronic device is being used for other purposes.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
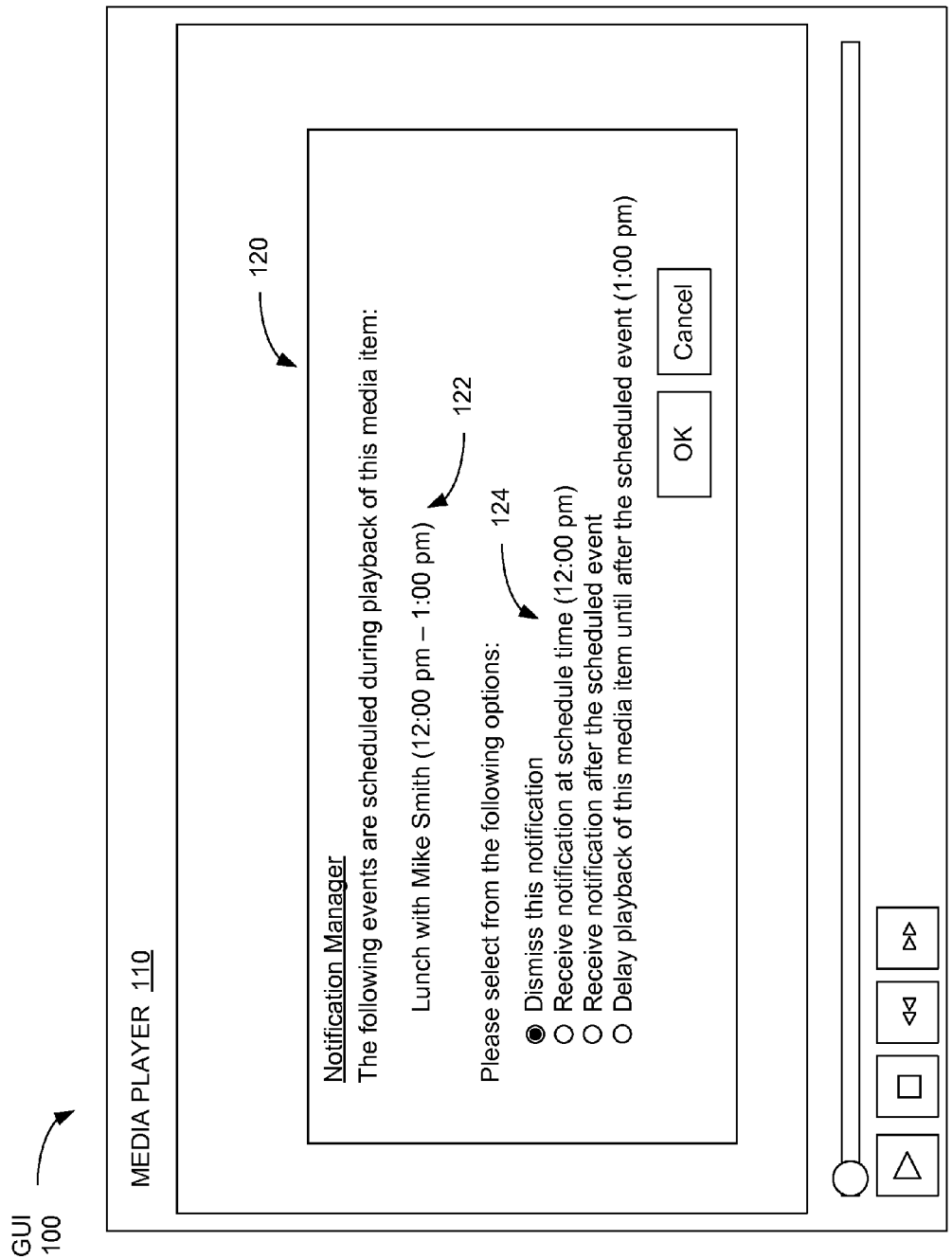
FIG. 1 is a diagram illustrating a user interface for preemptive event notification, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for preemptive event notification to improve the media experience. In one embodiment, a notification manager controls notifications provided by a user device while the user device is executing an action, such as for example, playing a media item. In one embodiment, in response to a request to execute the action, the notification manager provides a number of notification management options to the user. The user may select one of the notification management options, in order to control how notifications are delivered during the running time of the action. In response to the selection, the notification manager may control the delivery of the notifications. The notification management options may include, for example, disabling notifications for an event scheduled to occur during the running time of the action, receiving notifications as scheduled, receiving notifications of events after the action is completed, and/or delaying the execution of the action until after a scheduled event has occurred.

In one embodiment, the notification manager can preemptively provide notifications prior to executing the action. For example, in response to a request to begin playback of a media item at a start time, the notification manager can determine an end time of the media item. The end time may be equal to the start time plus a running time of the media item. The notification manager may then determine whether a calendar application, or other scheduling program, includes an event scheduled for an event time that falls between the start time and end time of the media item. If so, the notification manager can provide a notification of the event prior to beginning playback of the media item. In one embodiment, the notification manager can provide the same or similar user-selectable notification management options along with the preemptive event notification.

Using the techniques and methodologies described herein, the notification manager can improve the user experience with respect to receiving notifications. Preemptively providing the notifications prevents an action, such as the playback of a media item, from being interrupted. The notification manager also provides the user with control over how the notifications are delivered, so that the user may receive the notifications according to their own personal preferences. For example, during playback of a movie, the user may desire to receive notifications from certain applications (e.g., calendar) but disable notifications from other applications (e.g., email). The notification manager is customizable to serve an individual user's needs, which can improve the overall user experience.

FIG. 1 is a diagram illustrating a user interface 100 for preemptive event notification, according to an embodiment. In one embodiment, a notification manager can preemptively provide notifications prior to executing an action. For example, if a user were to launch an application, such as media player 110, and request the execution of an action (e.g., playback of a media item, such as a movie), a notification manager can determine if there are any events scheduled during the running time of the movie and provide a notification of the events in a notification interface 120. The notification interface 120 may appear in user interface 100, for example, as a pop-up window. In other embodiments, however, the notification interface 120 may take some other form. For example, the notification may be received as an email or text message, or the notification may include an audible signal, such as a chime, ring or spoken alert. The notification manager may be a software program running as a standalone application or as part an operating system of a user device. Additional details of the notification manager will be provided below.

In one embodiment, the notification interface 120 includes a list of scheduled events 122 and a list of notification management options 124. The list of scheduled events 122 may include events included in a calendar application or other scheduling program that have an associated event time that falls between a start time and an end time of the media item being played in media player 110. The notification manager may query the calendar application to determine if any events are scheduled during the running time of the media item and display those events in the list of scheduled events 122.

The list of notification management options 124 may include one or more options for how to deliver notifications corresponding to the events in the list of scheduled events 122. For example, the options may include dismissing the notification, receiving the notification again at the regularly scheduled time (thereby interrupting playback of the media item), receiving the notification once playback of the media item has completed or delaying playback of the media item until after the scheduled event. The user can select one of these options and then proceed with playback of the media item, if appropriate. In one embodiment, if there are multiple events in the list of scheduled events 122, a user may be able to separately select options from the list of notification management options 124 for each event. In another embodiment, the options in the list of notification management options 124 may vary depending on the type of event or on the application that that will be executing the action. Additional details regarding the management of notifications will be provided below.

Figure 2:
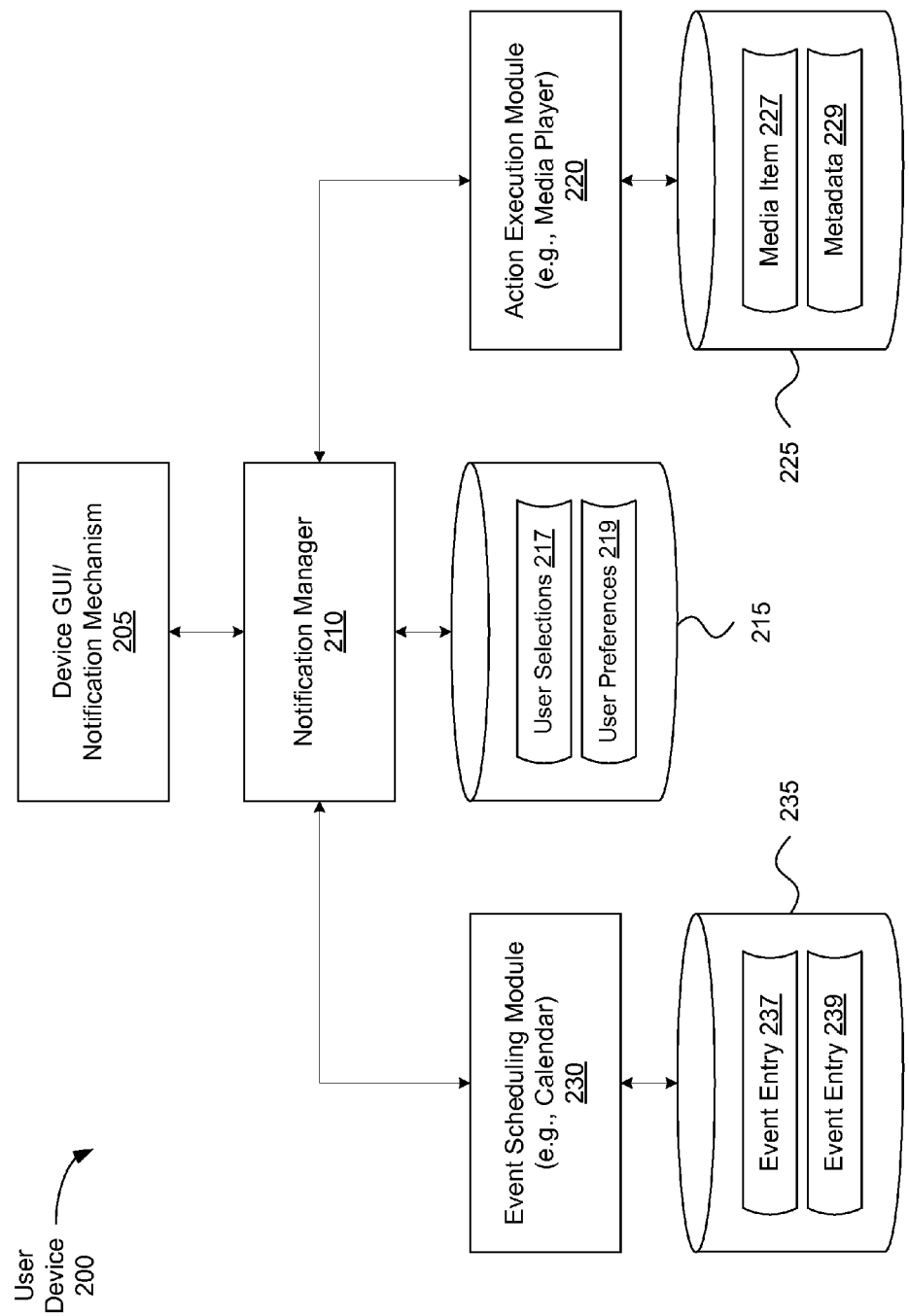
FIG. 2 is a block diagram illustrating a user device configured for preemptive event notification, according to an embodiment.

FIG. 2 is a block diagram illustrating a user device 200 configured for preemptive event notification, according to an embodiment. In one embodiment, the user device 200 includes a notification manager 210, an action execution module 220 and an event scheduling module 230. The notification manager 210 can provide notifications to a user of user device 200 through a device graphical user interface (GUI) or other notification mechanism 205. In one embodiment the device GUI 205 may correspond to the notification interface 120, described above with respect to FIG. 1.

In one embodiment, notification manager 210 controls the delivery of notifications through device GUI 205. For example, notification manager 210 can receive user input through device GUI 205 regarding how to handle the delivery of notifications. In addition, notification manager 210 can preemptively provide notifications prior to performing an action (e.g., playing a media item) based on information received from action execution module 220 and event scheduling module 230. In one embodiment, notification manager may receive a request for action execution module 220 to execute an action (e.g., start playback of a media item). In another embodiment, the request may be received directly by action execution module 220, which may provide an indication to notification manager 210 that action execution module 220 is going to execute the action. For example, the request may be for a media player 220 to begin playback of a media item 227 (e.g., a movie or video) at a start time (e.g., immediately, in five minutes, at 11:00 pm). In other embodiments, action execution module 220 may be some other application capable of performing the requested action. In response, notification manager 210 may determine an end time of the media item 227. In one embodiment, notification manager 210 reads metadata 229 associated with the media item 227 to determine a running time of the media item 227. In one embodiment, both the media item 227 and the metadata 229 are stored in a data store 225 associated with action execution module 220. Notification manager 210 may determine the end time by adding the running time to the start time of the media item 227.

In one embodiment, notification manager 210 determines whether there are any events scheduled between the start time and end time of the media item 227 that would have an associated notification. For example, notification manager 210 may query event scheduling module (e.g., a calendar application) 230, which may scan event entries 237, 239 in an associated data store 235. Either event scheduling module 230 or notification manager 210 may compare the event times associated with event entries 237, 239 to the start and end times of media item 227. If one of the event times falls between the start and end times of media item 227, notification manager 210 may preemptively provide a notification, through device GUI 205, prior to performing the requested action (e.g., playing media item 227 in media player 220). For example, as described above with respect to FIG. 1, notification manager 210 may provide a notification to the user indicating that there is an event scheduled to occur during the playback of the media item 227.

In one embodiment, notification manager 210 may additionally provide notification management options to the user through device GUI 205. For example, notification manager 210 may provide options including dismissing the notification, receiving the notification again at the regularly scheduled time (thereby interrupting playback of the media item 227), receiving the notification once playback of the media item 227 is completed or delaying playback of the media item 227 until after the scheduled event. Notification manager 210 may receive a selection of one of the options from the user. In one embodiment, notification manager 210 may store this user selection 217 in a data store 215 associated with notification manager 215. Data stores 215, 225 and 235 may be part of a common storage device or separate storage devices. In addition notification manager 210 may also store user preferences 219 in data store 215. User preferences 219 may include past user selections for certain specific or types of actions/notifications. In one embodiment, notification manager 210 may learn a user's preferences based on their past selections and in some cases, automatically handle notifications according to user preferences 219.

In response to receiving the user selections 217 with regard to notification management options, notification manager 210 may control delivery of notifications based on the selections 217. For example, if the user selects to dismiss the notification, notification manager 210 will not provide another notification for the associated event. Alternatively, if the user selects to receive the notification at the regular time, notification manager may provide the notification at or before the event time, thereby interrupting the playback of media item 227.

Figure 3:
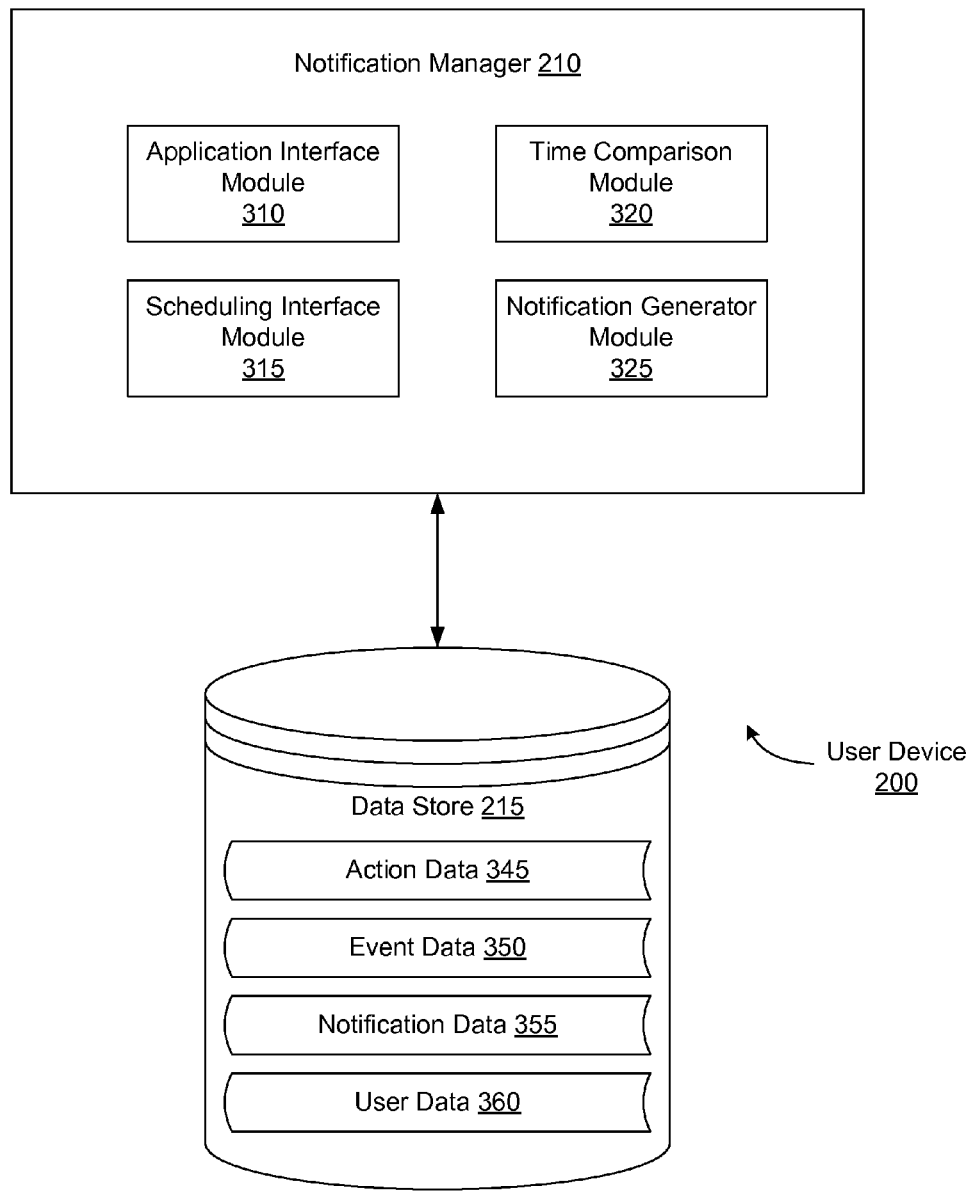
FIG. 3 is a block diagram illustrating a notification manager, according to an embodiment.

FIG. 3 is a block diagram illustrating a notification manager 210 that is included in user device 200, according to an embodiment. In one embodiment, notification manager may include application interface module 310, scheduling interface module 315, time comparison module 320, and notification generator module 325. In one embodiment, notification manager 210 is connected to a data store 215, which may be, for example, a file system, database or other data management layer resident on a data storage device such as a disk drive, RAM, ROM, flash memory, etc.

In one embodiment, application interface module 310 handles communication between notification manager 210 and other applications, such as action execution module 220. For example, action execution module 220 may provide a message indicating that a request was received to perform an action (e.g., play media item 227 on media player 220). Application interface module 310 may receive this message and send a request back to action execution module 220 for information about the start time and running time of the action (e.g., from metadata 229). Action execution module 220 can then provide the requested information, such as the start time and running time, to application interface module 310. In one embodiment, application interface module 310 may store this received information as action data 345 in data store 215.

In one embodiment, scheduling interface module 315 handles communication between notification manager 210 and event scheduling module 230, such as a calendar application. For example, in response to receiving information about an action to be executed, scheduling interface module 315 may request information about upcoming events from event scheduling module 230. For example, the request may be for any events scheduled during some default period of time (e.g., the next 24 hours). In one embodiment, event scheduling module 230 may return a list of events corresponding to event entries 237, 239 in data store 235. Each event may have a corresponding event time representing either the time that the event is supposed to begin or a time at which a notification for the event is supposed to be provided to the user. In one embodiment, scheduling interface module 315 may store this information as event data 350 in data store 215.

In one embodiment, time comparison module 320 compares the running times of an action received by application interface module 310 with the event times received by scheduling interface module 315. For example, if the start time of the action received by application interface module 310 is 2:30 pm and the running time is 90 minutes, time comparison module 320 can determine that the end time of the action is 4:00 pm. Time comparison module 320 can then compare the event times of events received by scheduling interface module 315 to the start and end times of the action. Time comparison module 320 can identify events with event times that fall between 2:30 pm and 4:00 pm. Time comparison module 320 can mark these events as events for which a preemptive notification may be sent. In one embodiment, time comparison module 320 identifies these events in notification data 355, stored in data store 215. In one embodiment, once time comparison module 320 determines the running time of the action, then scheduling interface module 315 can request information on events during that running time. In this manner, scheduling interface module 315 does not request information on any events that may not be relevant to the current action.

In one embodiment, notification generator module 325 generates notifications to be sent to the user (e.g., through device GUI 205). For example, notification generator module 325 may read the events in notification data 355 identified by time comparison module 320 as having preemptive notifications. Notification generator module 325 may generate a notification of these events and provide the notifications to the user. In one embodiment, the notifications may be provided along with a number of notification management options. These options may be specific to the particular event or to the type of event and may also be stored, for example, in notification data 355. In one embodiment, notification generator module 325 may also receive a user selection of one or more of the provided notification management options. Notification generator module 325 may store these received selections as user data 360 in data store 215. Notification generator module 325 may determine if additional notifications are needed and control the delivery of future notifications as specified by the stored selections. In another embodiment, event scheduling module 230 may generate and provide notifications for scheduled events at the direction of notification generator module 325. For example, if time comparison module 320 determines that there is an event scheduled during the running time of the action, notification generator module 325 may provide an indication to event scheduling module 230 of if and/or when to send out a notification. Event scheduling module 230 may then generate and send out the notification through its own user interface.

Figure 4:
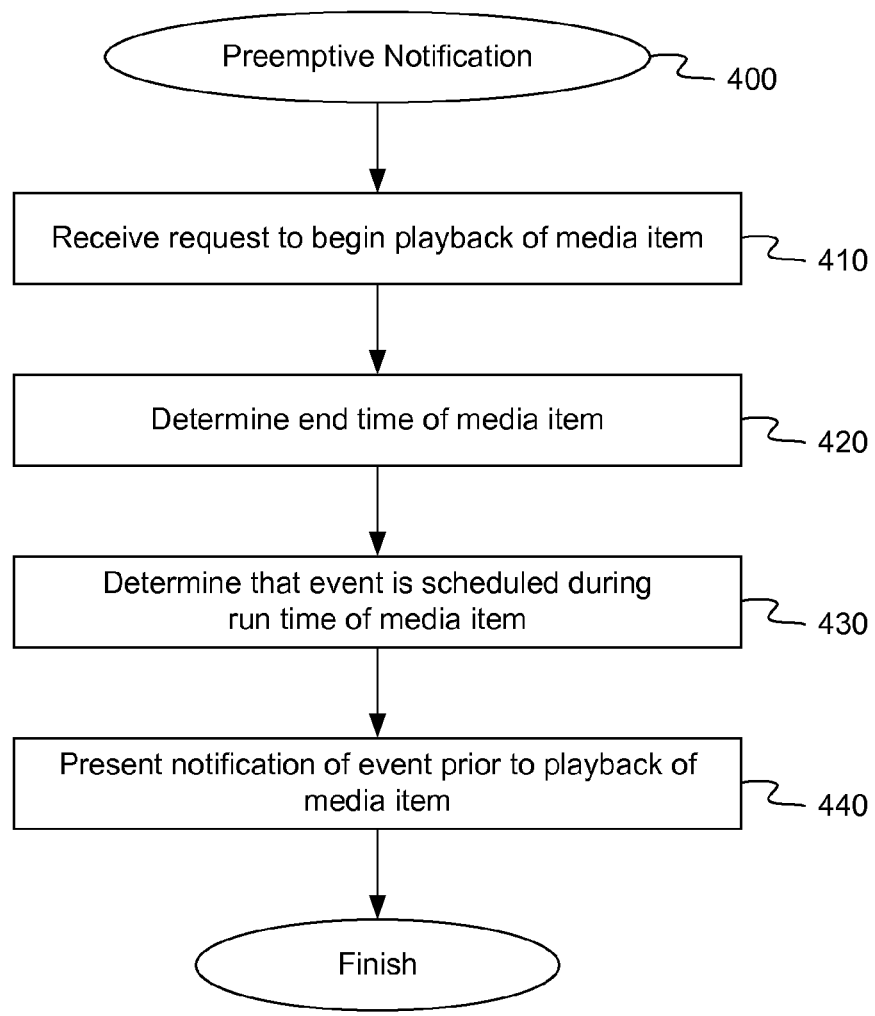
FIG. 4 is a flow diagram illustrating a preemptive notification method, according to an embodiment.

FIG. 4 is a flow diagram illustrating a preemptive notification method, according to an embodiment of the present invention. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to preemptively deliver notifications for an upcoming event before an action is executed, so as not to interrupt the execution of the action. In one embodiment, method 400 may be performed by notification manager 210, as shown in FIGS. 2 and 3.

Referring to FIG. 4, at block 410, method 400 receives a request to begin playback of a media item. In one embodiment, notification manager 210 receives the request from a user (e.g., through device GUI 205) and forwards the request to media player 220. In another embodiment, the media player 220 receives the request directly and forwards an indication of the request to notification manager 210, which is received by application interface module 310. In one embodiment, the request is to begin playback of a media item such as a movie, video, song, or audio clip. In other embodiments, however, the request may be to perform some other action.

At block 420, method 400 determines an end time of the media item. In one embodiment, the end time of the media item may be included with the received request. In another embodiment, application interface module 310 may request information from media player 220 from which the end time may be determined. For example, application interface module 310 may request the running time of the media item, which may be added to the start time of the media item to determine the end time. In yet another embodiment, application interface module 310 may directly request the end time of the media item from media player 220.

At block 430, method 400 determines that an event is scheduled during the run time of the media item. In one embodiment, scheduling interface module 315 issues a request to event scheduling module 230 for any events scheduled between the start time and end time of the media item. In another embodiment, scheduling interface module 315 issues a request to event scheduling module 230 for upcoming events and their associated event times. Time comparison module 320 may compare the event times to the start and end time of the media item to determine if any of the associated events are scheduled to occur during the run time of the media item. Time comparison module 320 may save the results of this determination as notification data 255 in data store 215.

At block 440, method 400 presents a notification of the event prior to playback of the media item. In one embodiment, notification generation module 325 generates a preemptive notification for events that are determined to occur during playback of the media item. Notification generation module 325 may present the notification to the user through device GUI 205, which is displayed on a display device 910 of computing system 900. In one embodiment, the notification may include an indication of the event, the event time and one or more notification management options, as described above. In one embodiment, the notification may include notification interface 120, as illustrated in FIG. 1.

Figure 5:
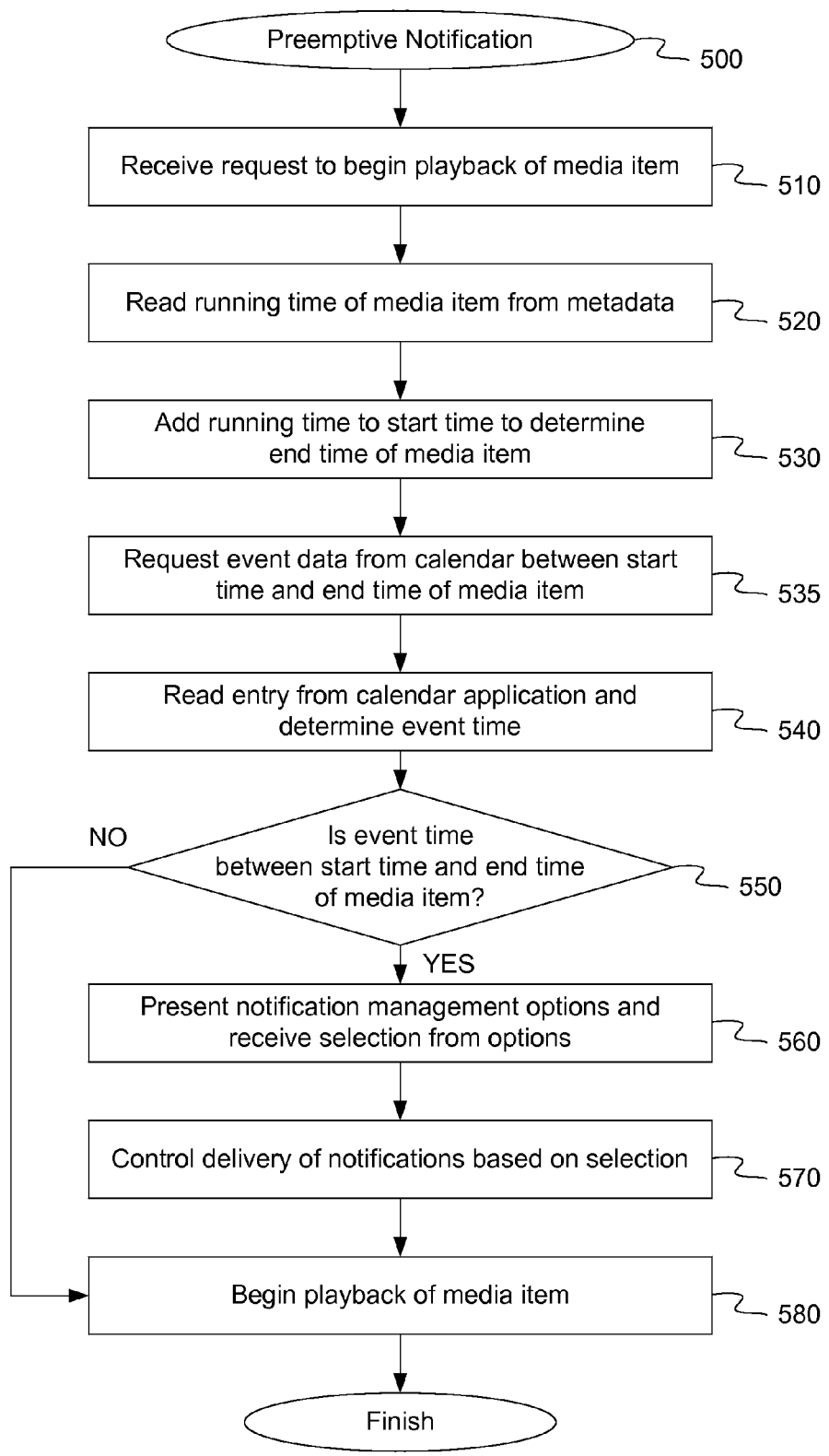
FIG. 5 is a flow diagram illustrating a preemptive notification method, according to an embodiment.

FIG. 5 is a flow diagram illustrating a preemptive notification method, according to an embodiment of the present invention. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to preemptively deliver notifications for an upcoming event before an action is executed, so as not to interrupt the execution of the action. In one embodiment, method 500 may be performed by notification manager 210, as shown in FIGS. 2 and 3.

Referring to FIG. 5, at block 510, method 500 receives a request to begin playback of a media item. In one embodiment, notification manager 210 receives the request from a user (e.g., through device GUI 205) and forwards the request to media player 220. In another embodiment, the media player 220 receives the request directly and forwards an indication of the request to notification manager 210, which is received by application interface module 310. In one embodiment, the request is to begin playback of a media item such as a movie, video, song, or audio clip. In other embodiments, however, the request may be to perform some other action.

At block 520, method 500 reads the running time of the media item from metadata associated with the media item. In one embodiment, application interface module 310 of notification manager 210 sends a request to media player 220 for the running time of the media item. Media player 220 may look up the media item 227 in data store 225 and read the metadata 229 associated with the media item 227. In one embodiment, a value indicating the running time is stored in the metadata 229. In other embodiments, the running time may be stored with the media item 227 itself, or in some other location. Media player 220 returns an indication of the running time to application interface module 310.

At block 530, method 500 adds the running time to the start time of the media item in order to determine an end time of the media item. In one embodiment, application interface module 310 computes the end time of the media item 227 based on the start time received in the request and the running time received from media player 220. In another embodiment, media player 220 computes the end time of the media item 227 or already stores the end time (e.g., in data store 225) and returns the end time directly to notification manager 210.

At block 535, method 500 requests event data from calendar 230 and/or any other applications that may have scheduled events, for events scheduled between the start time and end time of the media item as determined at block 530. In one embodiment, scheduling interface module 315 issues a request to calendar 230 for any events scheduled between the start time and end time of the media item. In another embodiment, scheduling interface module 315 issues a request to calendar 230 for upcoming events and their associated event times. At block 540, method 500 reads an entry from a calendar application to determine an event time of a scheduled event associated with the entry. Calendar 230 may have an associated data store 235 that includes one or more event entries 237, 239. Each of event entries 237, 239 may correspond to a scheduled event and have an associated event time. The event time can represent the time the event is scheduled to start, a time that a notification or reminder for the event is supposed to be sent, a specific time that is selected or input by the user, or some other time. Calendar 230 can provide the event times to notification manager 210 in response to the request from scheduling interface module 315. In another embodiment, calendar application 230 presents an application programming interface (API) that notification manager 210 can call in order to identify any scheduled events and the associated event times.

At block 550, method 500 determines if the event time falls between the start time and the end time of the media item. In one embodiment, time comparison module 320 may compare the event times received at block 540 to the start and end time of the media item determined at blocks 510 and 530 to determine if any of the associated events are scheduled to occur during the run time of the media item. In another embodiment, time comparison module 320 compares the event time to only one of the start time and the end time, for example, to determine if the event time falls after the start time or before the end time, respectively. Time comparison module 320 may save the results of this determination as notification data 255 in data store 215. In another embodiment, an actual comparison is not performed, but rather scheduling interface module 315 requests event times that fall between the start time and the end time of the media item. If scheduling interface module 315 receives an indication of an event in response to that request, scheduling interface module 315 may proceed as if the event time falls between the start time and the end time of the media item.

If at block 550, method 500 determines that an event time falls between the start time and the end time of the media item, at block 560, method 500 presents a notification and optionally, one or more notification management options to a user. In one embodiment, notification generation module 325 generates a preemptive notification for events that are determined to occur during playback of the media item. Notification generation module 325 may provide the notification to the user through device GUI 205. In one embodiment, the notification may include an indication of the event, the event time and one or more notification management options, as described above. In one embodiment, the notification may include notification interface 120, as illustrated in FIG. 1. In addition, method 500 receives a user selection of one of the provided notification management options. For example, the user may select to dismiss the notification, receive the notification again at the regularly scheduled time (thereby interrupting playback of the media item), or delay playback of the media item until after the scheduled event.

At block 570, method 500 controls delivery of notifications based on the received user selection. For example, if the user selects to dismiss the notification, notification generator module 325 will not send another notification for the event. Also, if the user selects to receive the notification as regularly scheduled (e.g., at the event time or at a predetermined time prior to the event time) or at some other user specified time, notification generator module 325 will generate another notification and provide it to the user as scheduled.

At block 580, method 500 begins playback of the media item. If at block 550, method 500 determines that the event time does not fall between the start time and the end time of the media item, method 500 may proceed directly to block 580, bypassing blocks 560 and 570.

Figure 6:
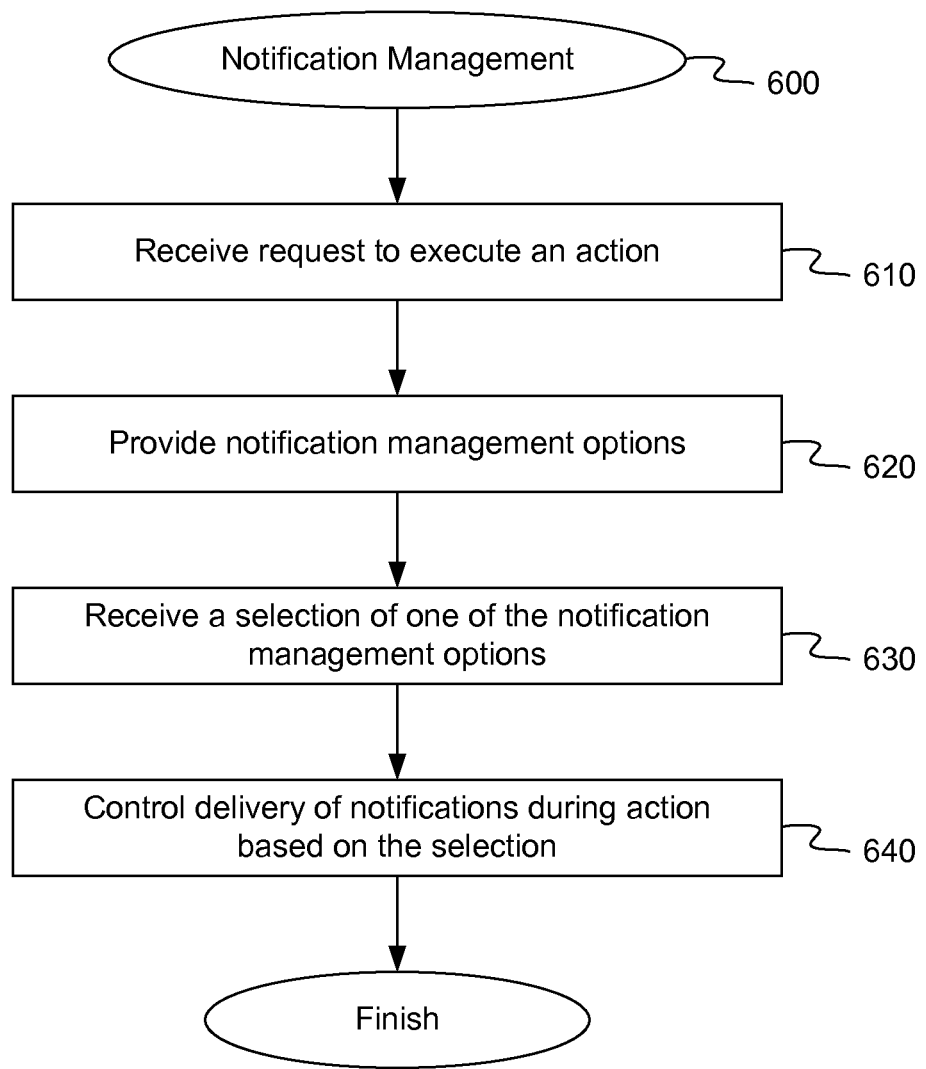
FIG. 6 is a flow diagram illustrating a notification management method, according to embodiment.

FIG. 6 is a flow diagram illustrating a notification management method, according to an embodiment of the present invention. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to manage notifications on a user device in order to improve the user experience. In one embodiment, method 600 may be performed by notification manager 210, as shown in FIGS. 2 and 3.

Referring to FIG. 6, at block 610, method 600 receives a request to execute an action. In one embodiment, notification manager 210 receives the request from a user (e.g., through device GUI 205) and forwards the request to action execution module 220. In another embodiment, the action execution module 220 receives the request directly and forwards an indication of the request to notification manager 210, which is received by application interface module 310. In one embodiment, the request is to begin playback of a media item such as a movie, video, song, or audio clip. In other embodiments, however, the request may be to perform some other action, such as reading an electronic book (e-book), magazine or article, playing a game, attending a web-based meeting or presentation, or other action.

At block 620, method 600 provides a number of notification management options to a user of the user device. In one embodiment, notification generator module 325 generates the notification management options or reads them from notification data 355. The notification management options may be tailored to the specific action or event or to the type of action or event. For example, if the action is not time bounded (e.g., reading a book, as opposed to watching a video that has a fixed know length), the notification management options may include the option to silence all notifications for some period of time (e.g., 1 hour). In other embodiments, the options may be to silence notifications for selected events for that period of time. Other options may include silencing notifications while the action is being performed (e.g., while the user is reading the book), or allowing notifications to be received as normally scheduled. If the action is time bounded, the notification management options may include, for example, silencing notifications (for all or just certain events) for the running time of the action, or allowing notifications to be received as scheduled.

In one embodiment, rather than providing options to the user, notification manager 210 automatically selects how to control delivery of notifications on behalf of the user. For example, notification manager 210 may learn a user's preferences based on their previous selections. In one embodiment, after some threshold number of selections for a certain type of event has been reached, notification manager 210 may automatically make that selection to control delivery of notifications until instructed otherwise by the user.

At block 630, method 600 receives a user selection of one of the provided notification management options. In one embodiment, notification manager 210 may receive a user selection, input by the user of user device 200 (e.g., through device GUI 205). Referring to the notification interface 120 of FIG. 1, the notification management options 124 may be displayed and selected by the user. For example, the user may select one or more of the options using radio buttons, check boxes, HTML links, input fields, etc.

At block 640, method 600 controls delivery of notifications during execution of the action based on the user selected notification management option. In one embodiment, notification generator module 325 controls notifications based on the type of action. Certain actions may have a fixed length, such as a movie, video, meeting, etc. Other actions may not be time-bounded, such as reading an e-book, playing a game, etc. Of those actions that have a fixed length, notification manager 210 may handle notifications for events that are previously scheduled (e.g., calendar entries, tasks), as well as those which are not scheduled (e.g., email message, text messages, phone calls). Thus, depending on the categorization of the action being performed, and the event associated with a notification, method 600 can control delivery of notifications differently, as described below.

Figure 7:
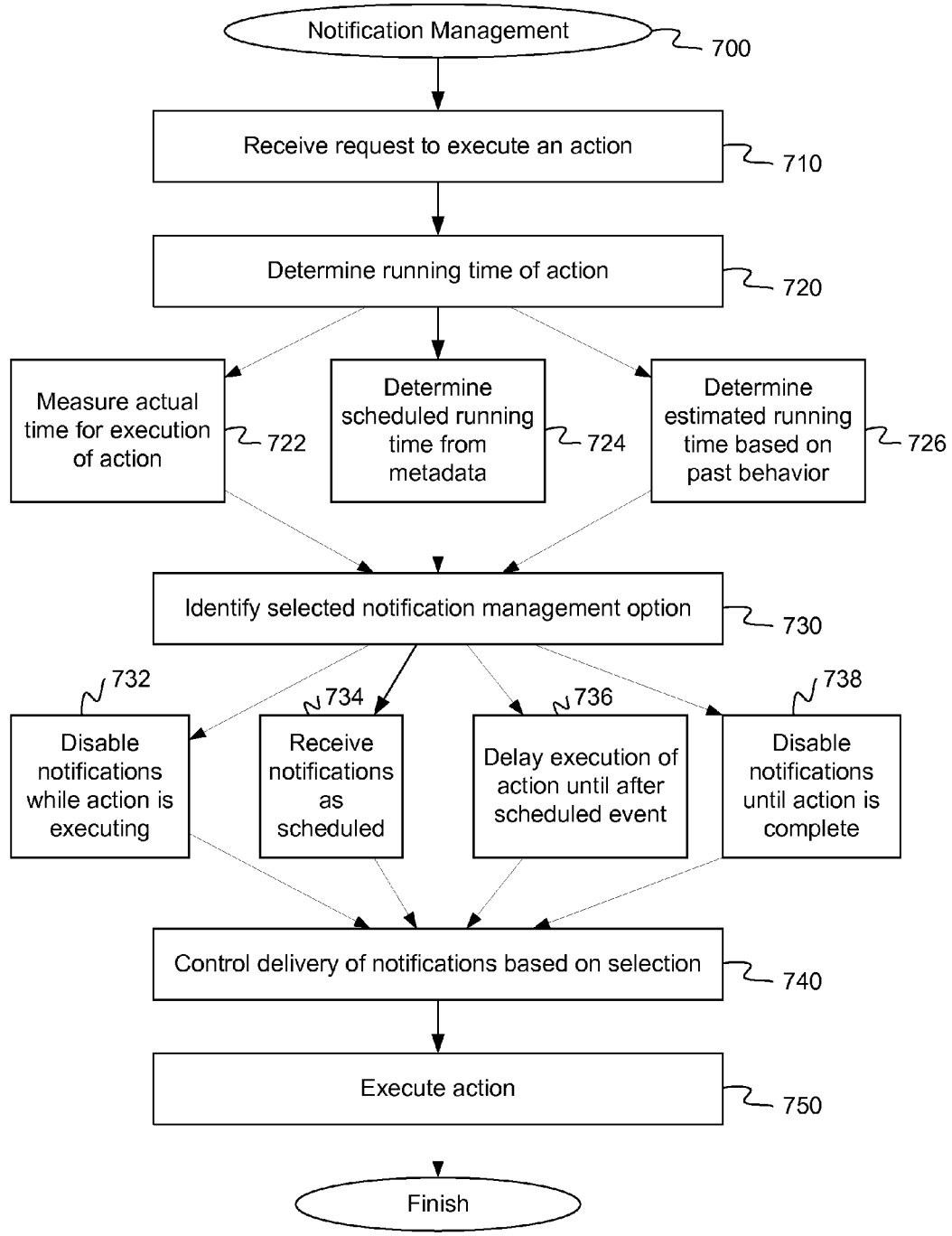
FIG. 7 is a flow diagram illustrating a notification management method, according to embodiment.

FIG. 7 is a flow diagram illustrating a notification management method, according to an embodiment of the present invention. The method 700 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to manage notifications on a user device in order to improve the user experience. In one embodiment, method 700 may be performed by notification manager 210, as shown in FIGS. 2 and 3.

Referring to FIG. 7, at block 710, method 700 receives a request to execute an action. At block 720, method 700 determines a running time of the action. In one embodiment, application interface module 310 determines the running time of the action. The running time may be representative of how long the action will take and/or for how long the notification management options that are selected by the user will be enforced by notification manager 210. There are a number of different ways to determine the running time, and different ways may be used depending on the type of action. In one embodiment, at block 722, method 700 measures the actual time for execution of the action. For example, application interface module 310 can receive information from action execution module 220 indicating how long action execution module 220 is actually executing the action. Thus, if the action is reading an e-book, action execution module 220 can report how long the e-book reading application is actually active. For example, application interface module 310 may receive a message from the application 220 indicating that the action is complete, at which point, notification manager 210 can optionally end the notification management option selected by the user. In this embodiment, notifications may not be received between the start and the end of the action. In another embodiment, at block 724, method 700 determines a scheduled running time from metadata associated with the action. Application interface module 310 may query action execution module 220 to read metadata 229, which may include the running time of a fixed-length action. For example, if the action is playing a movie or other media file, the metadata 229 associated with the movie may include a value representing the running time of the move. Action execution module 220 may return this value to notification manager 210 in response to the request and notification manager 210 may enforce the selected notification management options for that period of time. In yet another embodiment, at block 726, method 700 determines an estimated running time based on past behavior of the user or other users. For example, application interface module 310 may maintain information about past user behavior as user data 360 in data store 215. Each time an action is performed on behalf of a user, application interface module 310 may record how long it takes to perform the action. For example, if the action is reading an e-book, application interface module 310 may record how long the user reads the e-book. Application interface module 310 may also accumulate data from multiple users to determine how long users typically read any e-book for, or read this particular e-book for. In one embodiment, application interface module 310 may use an average of these values as the running time. In other embodiments, some other value may be used, such as the median value, the highest value, etc. In yet another embodiment, application interface module 310 may use a typical or average reading speed for the user, and calculate how long, at that speed, it may take the user to finish all or a portion (e.g., chapter, section) of the e-book. Application interface module 310 may use that calculated value as the running time. Regardless of how the running time is determined, application interface module may store the running time as action data 345 in data store 215.

At block 730, method 700 identifies a selected notification management option. The selection may be received from the user through device GUI 205. In one embodiment, at block 732, method 700 receives the selection of disabling notifications while the action is executing. This could, for example, be based on the running time of the action. Thus, notification generator module 325 may disable notifications for a certain period of time depending on how the running time was calculated at blocks 722-726. At block 734, method 700 receives the selection of receiving notifications as regularly scheduled. Thus, notification generator module 325 may generate and provide notifications as scheduled, even while the action is executing. In another embodiment, the selection may indicate some other time at which the user wishes to receive the notification. At block 736, method 700 receives the selection of delaying execution of the action until after the scheduled event. At block 738, method 700 receives the selection of delaying notifications until after then action has completed executing. In this embodiment, the notifications for any events having an event time scheduled to occur during the running time of the action may be delayed. Thus, the notifications will not be received while the action is being executed, but will all be received once the action is complete.

At block 740, method 700 controls delivery of notifications during execution of the action based on the user selected notification management option. At block 750, method 700 executes the requested action.

Figure 8:
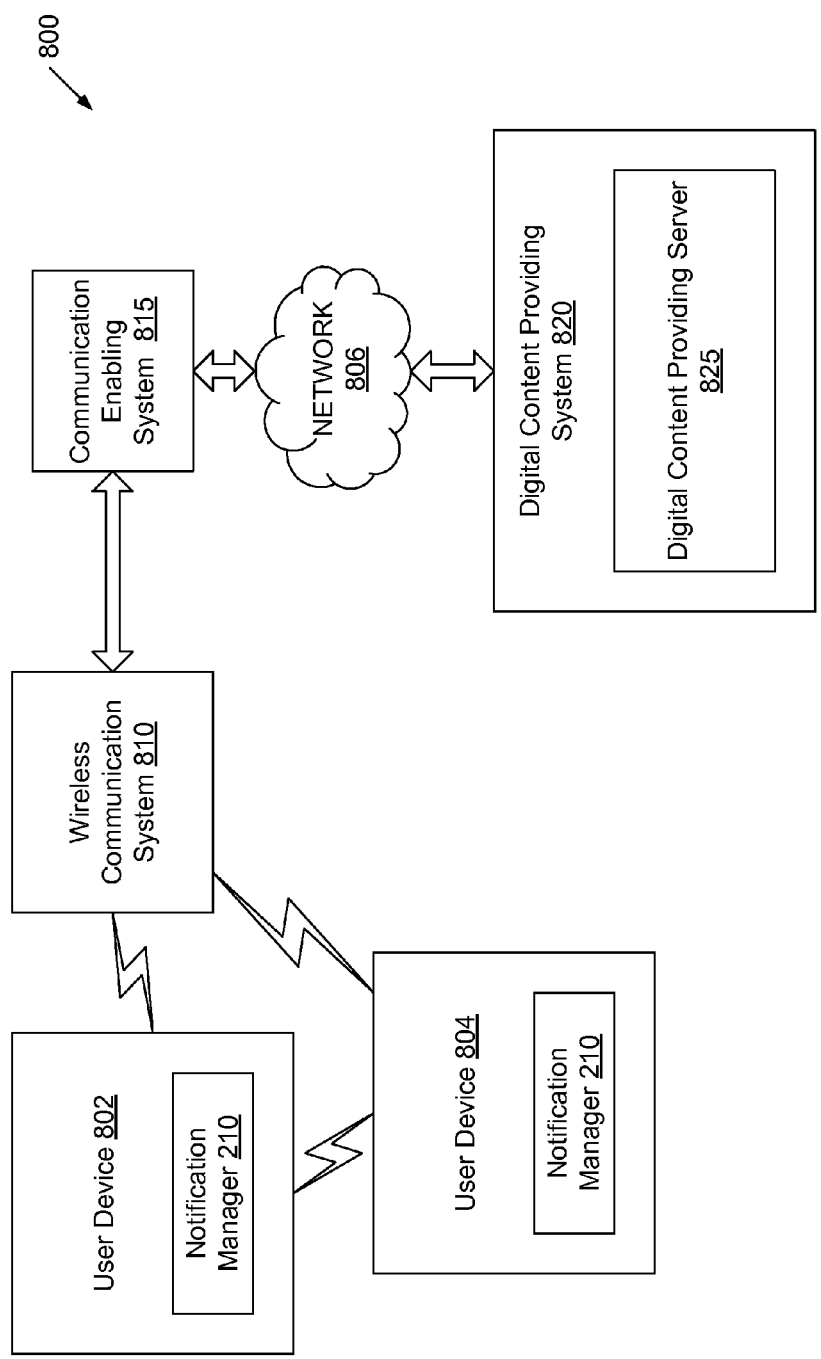
FIG. 8 is a block diagram of an exemplary network architecture, in which embodiments of the present invention may operate.

FIG. 8 is a block diagram of an exemplary network architecture 800, in which embodiments of the present invention described herein may operate. The network architecture 800 may include a digital content providing system 820 and one or more user devices 802, 804 capable of communicating with the digital content providing system 820 via a network 806. Network 806 may include, for example, a public network such as the Internet or a private network such as a local area network (LAN).

The user devices 802, 804 may be portable computing devices such as electronic book readers or tablet computers (e.g., that include a book reader application). Other examples of portable computing devices include cellular telephones, personal digital assistants (PDAs), portable media players, netbooks, and the like. The user devices 802, 804 may also be non-portable computing devices such as a desktop computer, a set-top box associated with a television, a gaming console, and so on. The user devices 802, 804 are variously configured with different features to enable consumption of one or more types of digital content and electronic publications. The digital content and electronic publications may include electronic books (ebooks) such as electronic textbooks and/or other electronic publications (electronic versions of publications) such as electronic magazines, digital newspapers, digital audio books, electronic journals, real simple syndication (RSS) feeds, etc. The publications may also include digital video (e.g., movies, television, short clips, etc.), images (e.g., art, photographs, etc.), and multi-media content.

The digital content providing system 820 may correspond to any feature or combination of features for providing electronic publications or other digital content to the user devices 802, 804. The digital content providing system 820 may include a network-accessible server-based functionality (digital content providing server 825), various data stores (not shown), and/or other data processing equipment. The digital content providing system 820 may be implemented by a single machine or a cluster of machines. The digital content providing system 820 may include one or more machines (e.g., one or more server computer systems, routers, gateways, etc.) that have processing and storage capabilities to provide the server-based functionality.

In one embodiment, the digital content providing server 825 corresponds to an entity which provides electronic publications (e.g., electronic books) to users upon the users' purchase or download of the items. In this role, the digital content providing server 825 may essentially act as a bookseller or the like. In other cases, the digital content providing server 825 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 825 may deliver, and the user devices 802, 804 receive, electronic publications (or other media items), search results, upgrades, and/or other information via the network 806. For example, the user devices 802, 804 may download or receive ebooks from the digital content providing server 825. The digital content providing server 825 may also receive various requests (e.g., search queries), instructions and other data from the user devices 802, 804 via the network 806.

Communication between the user devices 802, 804 and the item providing system 820 may be enabled via any communication infrastructure. One example of such an infrastructure includes a combination of a wide area network (WAN) and wireless infrastructure, which allows a user to use the user devices 802, 804 to purchase digital content (e.g., electronic publications) and consume the digital content without being tethered to the digital content providing system 820 via hardwired links. The wireless infrastructure may be provided by one or multiple wireless communications systems, such as wireless communication system 810. In one embodiment, wireless communication system 810 may be a wireless fidelity (WiFi) hotspot connected with the network 806. Wireless communication system 810 may also be a wireless carrier system that can be implemented using various data processing equipment, communication towers, etc. Alternatively, or in addition, the wireless carrier system may rely on satellite technology to exchange information with the user devices 802, 804.

The communication infrastructure may also include a communication-enabling system 815 that serves as an intermediary in passing information between the digital content providing system 820 and the wireless communication system 810. The communication-enabling system 815 may communicate with the wireless communication system 810 (e.g., a wireless carrier) via a dedicated channel, and may communicate with the digital content providing system 820 via a non-dedicated communication mechanism, (e.g., a public Wide Area Network (WAN) such as the Internet).

In addition to wirelessly connecting to wireless communication system 810, user devices 802, 804 may also wirelessly connect to other user devices 802, 804. For example, user device 802 may form a wireless ad hoc (peer-to-peer) network with user device 804 using WiFi, Bluetooth, or other wireless communication protocols.

In one embodiment, each of user devices 802, 804 include notification manager 210. As described above, notification manager 210 may be configured to manage notifications on user device 802, 804, including to provide preemptive notifications prior to beginning playback of a media item or performing some other action. Notification manager 210 may provide a user with a list of notification management options and control notifications based on a user selection of one of the options. Additional details of notification manager 210 are provided above.

Figure 9:
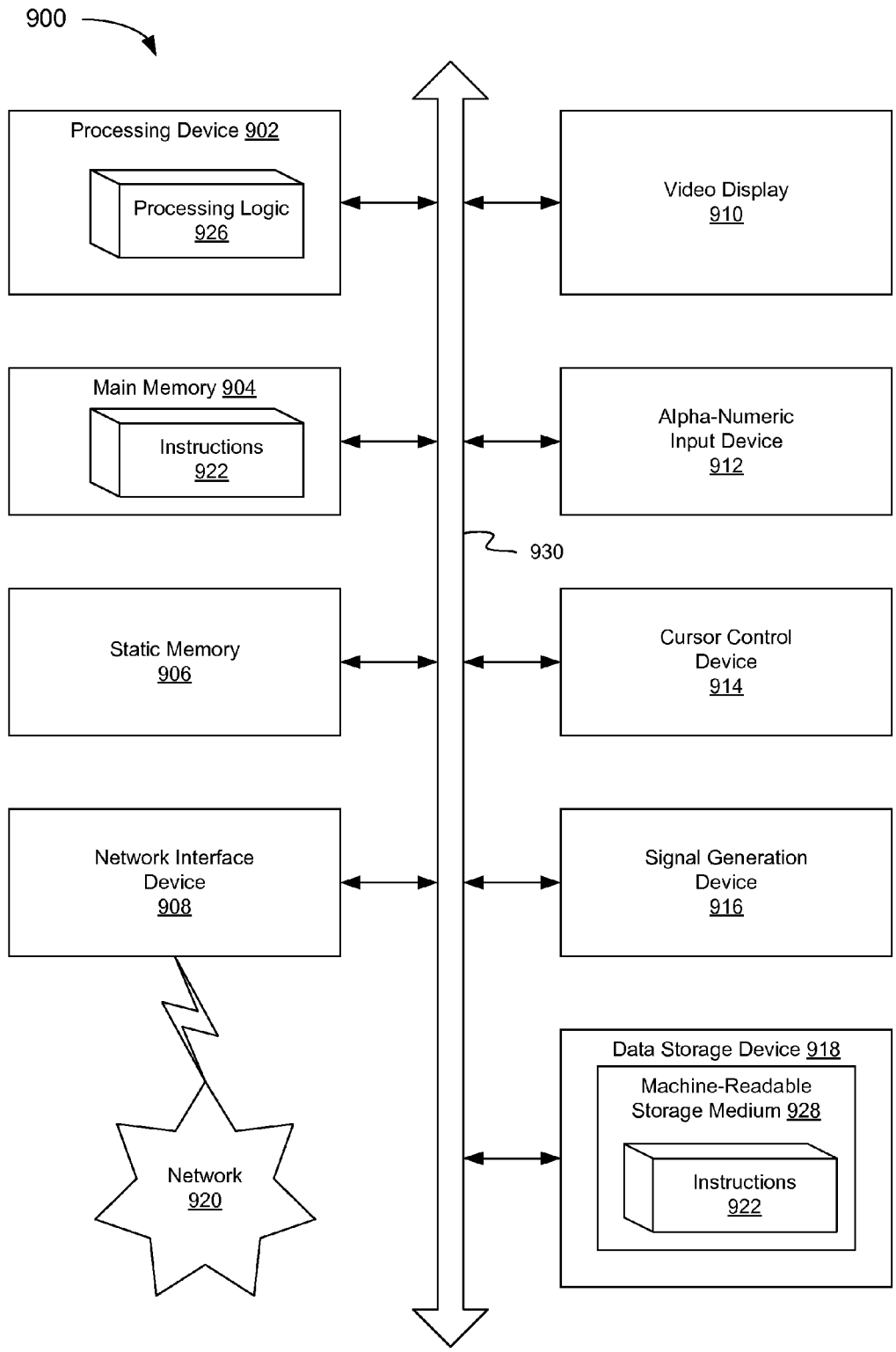
FIG. 9 is a block diagram illustrating an exemplary computer system, according to an embodiment.

FIG. 9 illustrates a diagrammatic representation of a machine in the exemplary form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may represent digital content providing server 820 of FIG. 8 and/or user device 200 of FIG. 2.

The exemplary computer system 900 includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute the notification manager 210 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions 922 (e.g., instructions of notification manager 210) embodying any one or more of the methodologies or functions described herein. The instructions 922 may also reside, completely or at least partially, within the main memory 904 and/or within processing logic 926 of the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Figure 10:
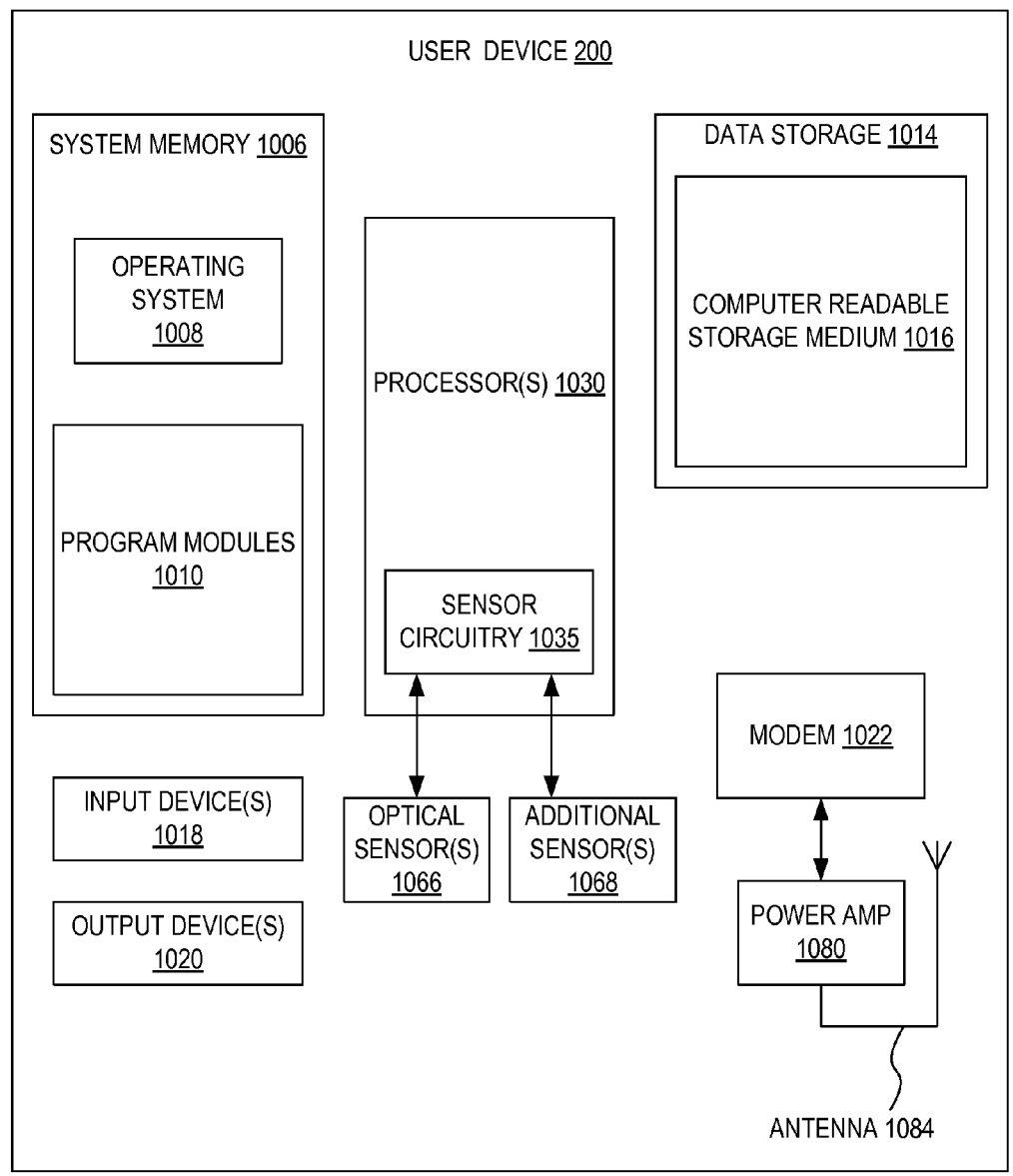
FIG. 10 is a block diagram illustrating an exemplary user device, according to an embodiment.

FIG. 10 is a block diagram illustrating an exemplary user device 200, according to an embodiment of the present invention. In one embodiment, the user device 200 may correspond to one or all of the user devices 200 of FIG. 2 or 802, 804 of FIG. 8 and may be any type of user device such as an electronic book reader, a PDA, a mobile phone, a laptop computer, a portable media player, a tablet computer, an electronic pad, a desktop computer, a camera, a video camera, a netbook, and the like.

The user device 200 includes one or more processors 1030, such as one or more CPUs, microcontrollers, field programmable gate arrays, or other types of processors. The user device 200 also includes system memory 1006, which may correspond to any combination of volatile and/or non-volatile storage mechanisms. The system memory 1006 stores information which provides an operating system component 1008, various program modules 1010, and/or other components. The user device 200 performs functions by using the processor(s) 1030 to execute instructions provided by the system memory 1006.

The user device 200 also includes a data storage device 1014 that may be composed of one or more types of removable storage and/or one or more types of non-removable storage. The data storage device 1014 includes a computer-readable storage medium 1016 on which is stored one or more sets of instructions embodying any one or more of the methodologies or functions described herein. As shown, the instructions may reside, completely or at least partially, within the computer readable storage medium 1016, system memory 1006 and/or within the processor(s) 1030 during execution thereof by the user device 104, the system memory 1006 and the processor(s) 1030 also constituting computer-readable media. The user device 200 may also include one or more input devices 1018 (keyboard, mouse device, specialized selection keys, etc.) and one or more output devices 1020 (displays, printers, audio output mechanisms, etc.).

The user device 200 further includes a wireless modem 1022 to allow the user device 200 to communicate via a wireless network (e.g., such as provided by the wireless communication system) and/or with other computing devices, such as remote computers, the item providing system, online book stores, electronic catalogs for libraries, and so forth. The wireless modem 1022 may allow the user device 200 to handle both voice and non-voice communications (such as communications for text messages, multimedia messages, media downloads, web browsing, etc.) with the wireless communication system 810. The wireless modem 1022 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, etc. The wireless modem 1022 may generate signals and send these signals to power amplifier (amp) 1080 for amplification, after which they are wirelessly transmitted via antenna 1084. In addition to sending data, antenna 1084 also receives data, which is sent to wireless modem 1022 and transferred to processor(s) 1030.

In one embodiment, user device 200 includes an optical sensor 1066. The optical sensor 1066 may be a low resolution camera (e.g., having 0.2 or 0.3 Megapixels) that takes images (e.g., of a user's eyes) on a periodic basis. Alternatively, the optical sensor 1066 may have a higher resolution, such as 1 Megapixel up to 10 or more Megapixels. The optical sensor 1066 may be positioned such that images are taken of a user's face while the user holds the user device 200 in front of his face in a standard reading position. Therefore, the optical sensor 1066 may be used to track user eye movement during reading.

In one embodiment, user device 200 includes one or more additional sensors 1068 such as a physical contact sensor, close proximity sensors, or motion sensors. The sensors 1068 can detect the presence of human body parts, and convey information regarding the detected presence to processor(s) 1030. In one embodiment, the sensors 1068 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 1068 may also be optical (e.g., infrared) sensors that use an emitter and receiver pair to detect the presence of opaque objects. Alternatively, the sensors 1068 may be inductive sensors, which include an inductive loop. When the presence of a human body part (or metal object) is brought close to the inductive sensor, an induction of the inductive loop changes, causing the human body part to be detected. Alternatively, the sensors 1068 may be ultrasonic sensors that emit an ultrasonic signal and measure a time duration between when a signal is transmitted and the reflection of that signal received (a.k.a., flight response). The sensors 1068 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 1068 include a motion sensor, such as an accelerometer or one or more gyroscopes. The user device 200 may use motion data from motion sensors to determine whether a user is holding the user device 200. For example, if the user device 200 experiences constant minor accelerations, it may be determined that the user device 200 is being held in a user's hand. Additionally, if the user device 200 is at a particular angle (detectable based on acceleration readings from an accelerometer), it may be determined that the user device 200 is being rested on a user's leg during reading.

The processor(s) 1030 may include sensor circuitry 1035 (e.g., sensor device drivers) that enables the processor(s) 1030 to interpret signals received from the optical sensor(s) 1066 and/or additional sensors 1068. In one embodiment, the optical sensors 1066 and/or additional sensors 1068 output raw sensor data. In another embodiment, the optical sensors 1066 and/or additional sensors 1068 output fully processed signals to the processor(s) 1030. For example, the additional sensors 1068 may output a user contact/no user contact signal using a single line interface or a multi-line interface. In another embodiment, the additional sensors 1068 output, for example, positional data and/or object presence data (e.g., of a human body part) to the processors 1030 without first processing the data. In either instance, the processors 1030 may use the sensor circuitry 1035 to process and/or interpret the received data. If data is received from multiple sensors, processing the data may include averaging the data, identifying a maximum from the data, or otherwise combining the data from the multiple sensors.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device, a request to begin playback of a media item, the playback to begin at a start time;
   determining, by the processing device, an end time of the media item, wherein the end time is based on the start time and a running time of at least a portion of the media item;
   determining, by the processing device, that a calendar application includes a scheduled event having an associated notification to be displayed at an original event notification time, where the original event notification time is between the start time and the end time of the media item;
   presenting, by the processing device prior to the start time, a plurality of notification management options that relate to determining when to display the notification associated with the event;
   receiving, by the processing device, a selection of a first option of the plurality of notification management options, the first option comprising delaying presentation of the notification until the playback of the media item is complete at the end time of the media item; and
   preventing, by the processing device, presentation of the notification associated with the event on a display of a computing device at the original event notification time and delaying presentation of the notification as indicated by the first option, wherein the end time of the media item occurs a period of time after the original event notification time.

2. The method of claim 1, wherein determining the end time of the media item comprises reading the running time of the media item from metadata associated with the media item and adding the running time to the start time.

3. The method of claim 1, wherein determining that the calendar application includes an event comprises:
   obtaining event data from a calendar entry associated with the calendar application, the calendar entry associated with the event;
   determining the original event notification time from the event data in the entry; and
   comparing the original event notification time to the start time and the end time of the media item.

4. The method of claim 1, wherein presenting the notification of the event prior to beginning playback of the media item comprises displaying a visual notification of the event on a display device, the visual notification indicating an event time of the event.

5. The method of claim 1, wherein presenting the plurality of notification management options comprises presenting at least one of an option for dismissing the notification, receiving the notification again at an event time, delaying the notification until the playback of the media item is completed, or delaying the playback of the media item until after the event time.

6. A system, comprising:
   a memory; and
   a processing device, operatively coupled to the memory, the processing device to:
   receive a request for an application to execute an action;
   present a plurality of notification management options prior to execution of the action, the plurality of notification management options to control notifications during a running time of the action, the notifications originally to be displayed at corresponding original notification times during the running time of the action;
   receive a selection of a first option of the plurality of notification management options, the first option comprising delaying presentation of the notifications until execution of the action is complete; and
   control a delivery of the notifications during the running time of the action based on the selection of the first option, wherein to control the delivery of the notifications, the processing device is further to prevent presentation of the notifications on a display of the system at the original notification times and delay presentation of the notifications as indicated by the first option.

7. The system of claim 6, wherein to control the delivery of notifications, the processing device is further to disable a notification for an event scheduled to occur during the running time of the action.

8. The system of claim 6, wherein the running time of the action is an actual period of time between a start and an end of the action, the processing device to determine the actual period of time from the application executing the action.

9. The system of claim 6, wherein the running time of the action is a period of time that executing the action is scheduled to take, the processing device to determine the period of time from metadata associated with the action.

10. The system of claim 6, wherein the running time of the action is an estimated period of time for executing the action, where the estimated period of time is based on past behavior of a user with respect to the action and other actions.

11. The system of claim 6, wherein the processing device is further to provide notifications for events as scheduled during the running time of the action.

12. The system of claim 6, wherein the processing device is further to provide a warning that an event is scheduled to occur during the running time of the action and provide an option to delay the executing of the action until after the event has occurred.

13. A non-transitory computer-readable storage medium storing instructions which, when executed, cause a processing device to perform operations comprising:
 receiving, by the processing device, a request for an application to execute an action;
 determining, by the processing device, that an event is scheduled to occur during a time that the application is scheduled to execute the action;
 receiving a selection of a first option of a plurality of notification management options, the first option comprising delaying presentation of a notification associated with the event until execution of the action is complete; and
 preventing, by the processing device, presentation of the notification on a display of a computing device at a corresponding original notification time and delaying presentation of the notification as indicated by the first option.

14. The non-transitory computer-readable storage medium of claim 13, wherein the action comprises presenting a media item.

15. The non-transitory computer-readable storage medium of claim 13, wherein the action comprises an activity having an estimated running time, and wherein the estimated running time comprises a fixed time determined from metadata associated with the action.

16. The non-transitory computer-readable storage medium of claim 13, wherein the action comprises an activity having an estimated running time, and wherein the estimated running time comprises an estimated time based on past behavior of a user with respect to the action and other actions.

17. The non-transitory computer-readable storage medium of claim 13, wherein the event comprises an entry in a calendar application, the entry storing an event time at which the event is scheduled to occur.

18. The non-transitory computer-readable storage medium of claim 17, wherein determining that the event is scheduled to occur during the time that the action is being performed comprises comparing the event time to a start time of the action and an estimated end time of the action to determine if the event time is between the start time and the estimated end time.

19. The non-transitory computer-readable storage medium of claim 17, wherein determining that the event is scheduled to occur during the time that the action is being performed comprises;
 requesting an indication, from the calendar application, of any event scheduled to occur between a start time and an estimated end time of the action; and
 in response to the requesting, receiving an indication of the event.

20. The non-transitory computer-readable storage medium of claim 13, wherein the operations further comprise:
 presenting a plurality of notification management options prior to the original notification time, the plurality of notification management options comprising at least one of dismissing the notification, receiving the notification as scheduled, delaying the notification until the action is completed, or delaying the executing of the action until after the event occurs.

* * * * *